United States Patent
Chen

(10) Patent No.: US 6,468,014 B2
(45) Date of Patent: *Oct. 22, 2002

(54) SCREW WITH SPIRAL TRIANGULAR THREADS

(75) Inventor: Chun-Chin Chen, Taipei (TW)

(73) Assignee: Chun Chen Screw Co., Ltd., Taipei Hsien (TW)

(*) Notice: Subject to any disclaimer, the term of this patent is extended or adjusted under 35 U.S.C. 154(b) by 0 days.

This patent is subject to a terminal disclaimer.

(21) Appl. No.: 09/760,838

(22) Filed: Jan. 17, 2001

(65) Prior Publication Data

US 2001/0005474 A1 Jun. 28, 2001

Related U.S. Application Data

(63) Continuation-in-part of application No. 09/451,712, filed on Dec. 1, 1999.

(51) Int. Cl.[7] .................................................. F16B 35/06
(52) U.S. Cl. ..................................... 411/411; 411/387.4
(58) Field of Search .............................. 411/386–387.8, 411/411, 416, 308–311

(56) References Cited

U.S. PATENT DOCUMENTS

| | | | | |
|---|---|---|---|---|
| 3,104,161 A | * | 9/1963 | Carlson | |
| 3,683,437 A | * | 8/1972 | Larson | |
| 4,069,730 A | * | 1/1978 | Gutshall | |
| 4,259,889 A | * | 4/1981 | Capuano | |
| 4,637,767 A | * | 1/1987 | Yaotani | |
| 5,795,120 A | * | 8/1998 | Hurdle | |

FOREIGN PATENT DOCUMENTS

GB 957675 * 5/1964 ................. 411/416

* cited by examiner

Primary Examiner—Flemming Saetner
(74) Attorney, Agent, or Firm—Leong C. Lei

(57) ABSTRACT

A screw includes a cylindrical shank having an upper portion formed with spiral circular threads and a lower portion formed with spiral triangular threads, each of the spiral triangular threads having three budges having three sharp edges and three pointed tips, the pointed tips of the spiral triangular threads being located at different positions, the cylindrical shank having a pointed end at a lower portion thereof, whereby the screw can be easily and rapidly turned into a piece of hard wood.

1 Claim, 7 Drawing Sheets

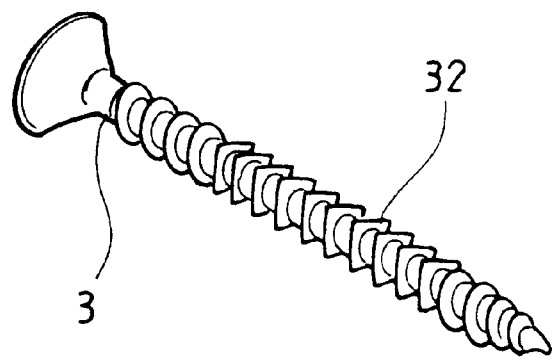
FIG. 4A
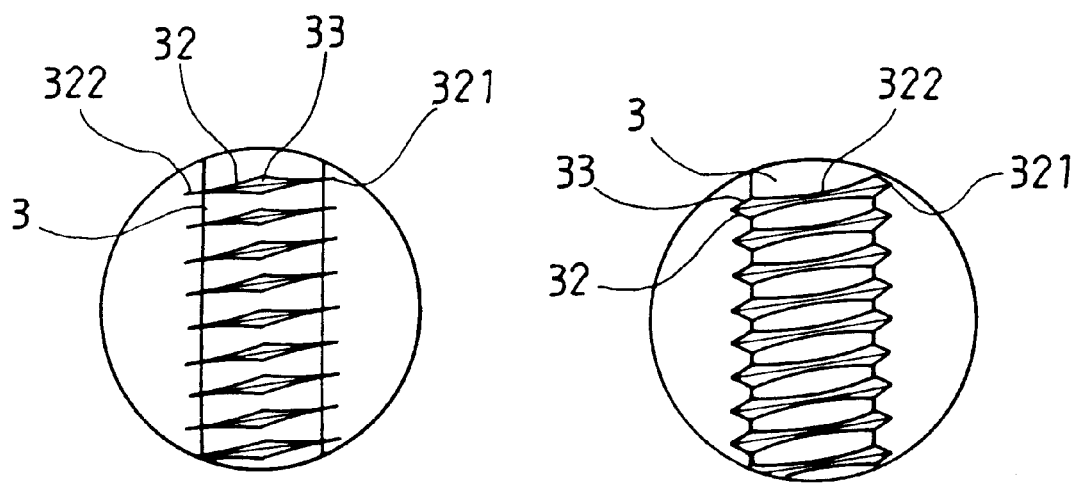
FIG. 4B  FIG. 4C

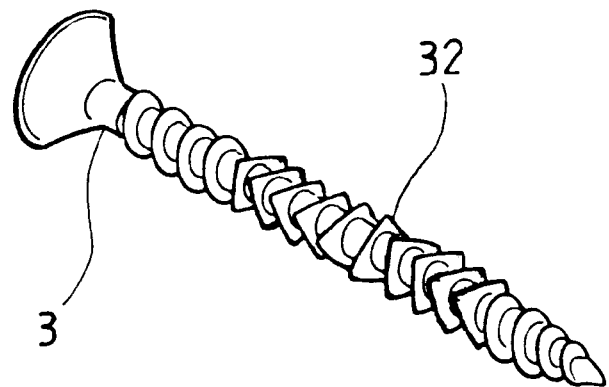
FIG. 5
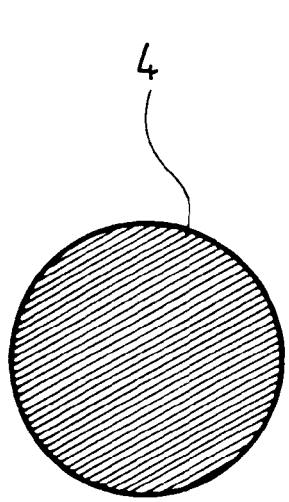 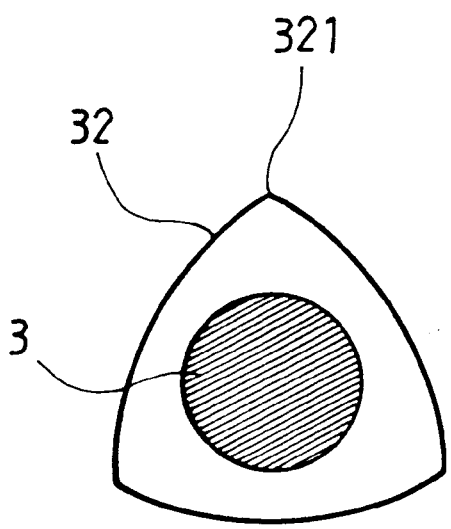
FIG. 6A    FIG. 6B

SCREW WITH SPIRAL TRIANGULAR THREADS

CROSS-REFERENCE

This is a continuation-in-part of U.S. patent application Ser. No. 09/451,712 filed Dec. 1, 1999.

BACKGROUND OF THE INVENTION

1. Field of the Invention

This invention is related to an improvement in the structure of a screw and in particular to one which can be easily turned into a piece of hard wood.

2. Description of the Prior Art

The conventional screw consists essentially of a solid cylinder, usually of metal, around which a thread winds spirally, either clockwise or counterclockwise. However, it is difficult to turn the screw into an object if it is made of hard wood. Hence, an improved screw as shown in UK Patent No. 2040769 (see FIGS. 1A, 1B, 1C, 1D and 1E) has been designed to obviate this drawback. As shown, the screw includes a triangular shankformed with spiral triangular threads 11. The shank 1 is first processed into one with a triangular cross section and then cut with spiral threads 11. U.S. Pat. No. 5044855 (see FIGS. 2 and 2A) also discloses a screw 2 with a triangular shank with a smaller diameter at the lower end and formed with spiral triangular threads 21. However, although the spiral triangular threads 21 can facilitate the turning of the screw into the wood, it still requires a lot of effort to turn the screw because of the resistance produced by the rotation of the triangular shank in the wood thereby often making one feel utterly exhausted in order to fasten pieces of hard wood.

Therefore, it is an object of the present invention to provide an improvement in the structure of a screw which can obviate and mitigate the above-mentioned drawbacks.

SUMMARY OF THE INVENTION

This invention is related to an improvement in the structure of a screw.

According to a preferred embodiment of the present invention, a screw includes a cylindrical shank having an upper portion formed with spiral circular threads and a lower portion formed with spiral triangular threads, each of the spiral triangular threads having three budges having three sharp edges and three pointed tips, the pointed tips of the spiral triangular threads being located at different positions, the cylindrical shank having a pointed end at a lower portion thereof.

It is the primary object of the present invention to provide an improved screw which can be easily turned into a piece of hard wood.

It is another object of the present invention to provide an improved screw which is simple in construction.

It is a further object of the present invention to provide an improved screw which is inexpensive to manufacture.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principle of the present invention is shown by way of illustrative example.

BRIEF DESCRIPTION OF THE DRAWINGS

FIGS. 4A, 4B and 4C illustrate a second preferred embodiment of the present invention;

FIG. 5 is a perspective view of a third preferred embodiment of the present invention;

FIGS. 6A and 6B illustrate how to manufacture the present invention;

DETAILED DESCRIPTION OF THE PREFERRED EMBODIMENT

Figure 1E:
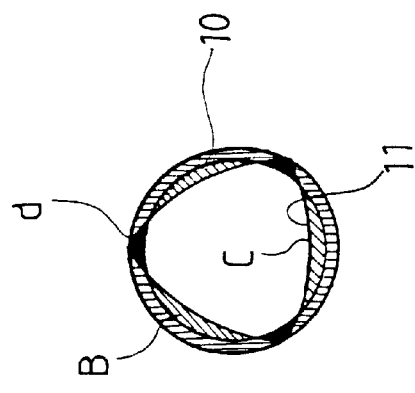
FIG. 1E is a bottom view of the prior art screw.
Figure 1C:
FIG. 1C illustrates the prior art screw with threads.
Figure 1D:
FIG. 1D is a cross sectional view of FIG. 1C.
Figure 1A:
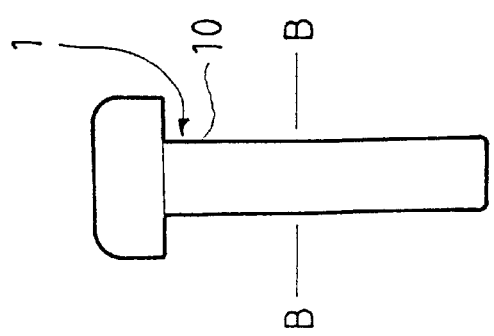
FIG. 1A illustrates a prior art screw without threads.
Figure 1B:
FIG. 1B is a cross sectional view of FIG. 1A.
Figure 2A:
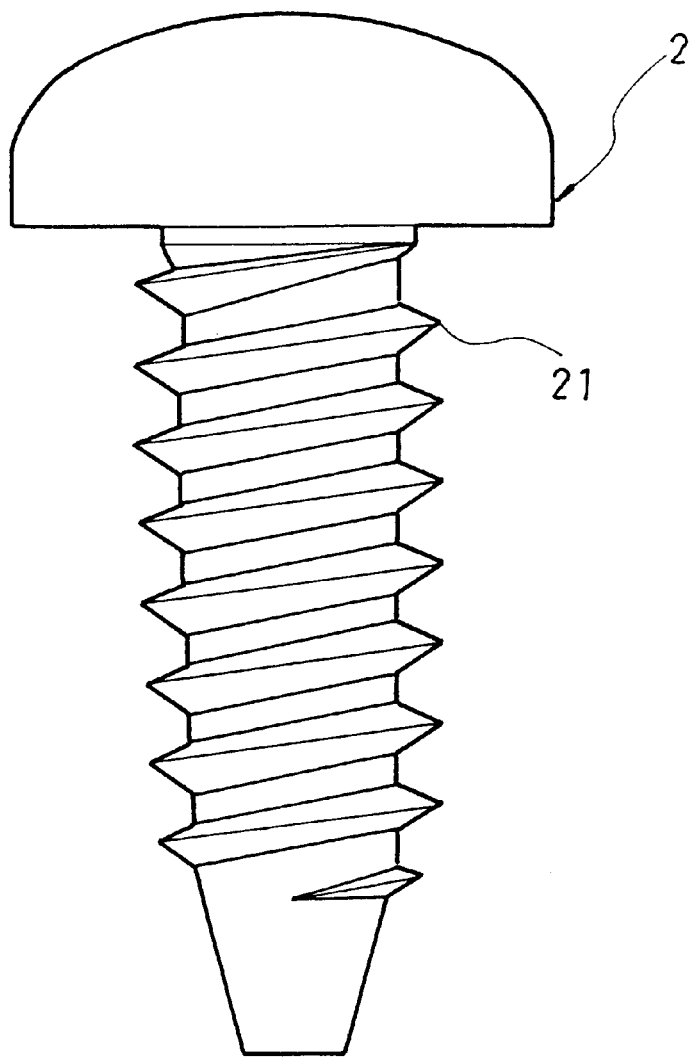
FIG. 2A illustrates a second prior art screw.
Figure 2B:
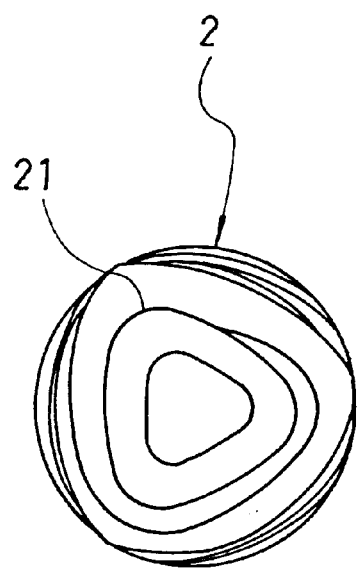
FIG. 2B is a bottom view of the second prior art screw.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
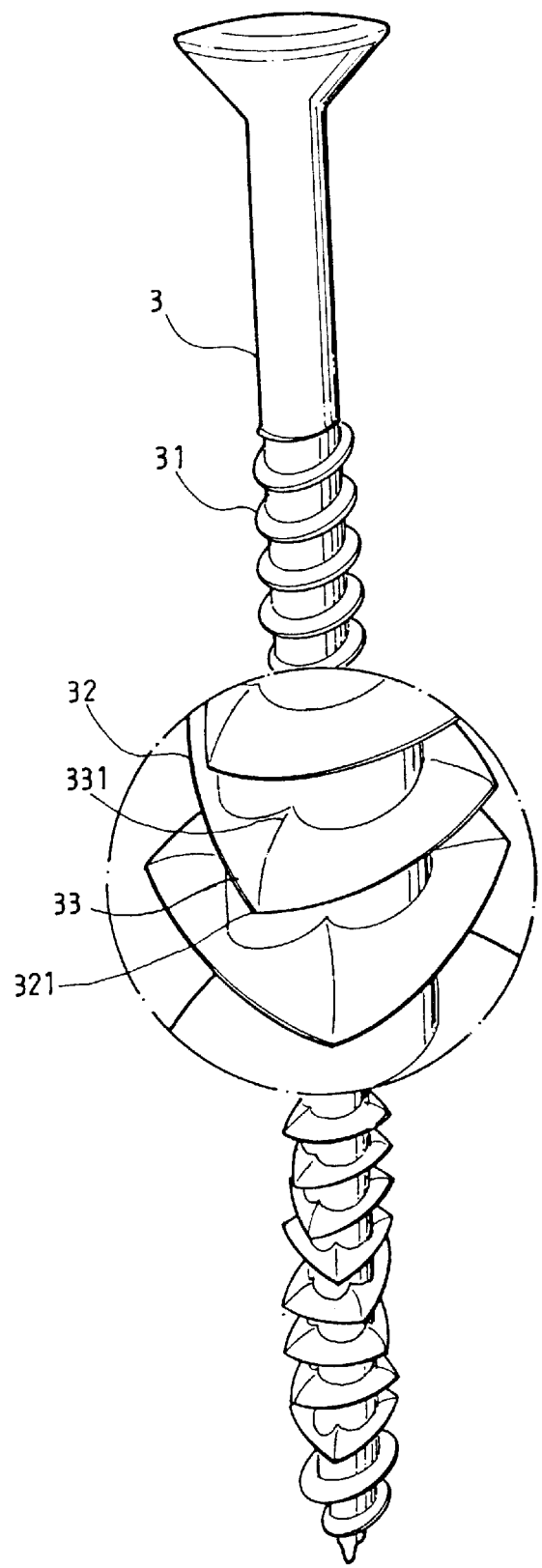
FIG. 3 is a perspective view of the present invention.

With reference to the drawings and in particular to FIG. 3 thereof, the screw according to the present invention comprises a cylindrical shank 3 formed with spiral circular threads 31 at the upper portion and spiral triangular threads 32 at the lower portion. The cylindrical shank 3 has a pointed end at a lower portion thereof. Each of the spiral triangular threads 32 has three bulges 33 each having a sharp edge and pointed tips 321. Between every two of the bulges 33 there is a ridge 331. The spiral triangular threads 32 are arranged so that the pointed tips 321 of each of the spiral triangular threads 32 are located at different positions. Hence, when the screw is turned into a piece of hard wood, the pointed tips 321 and the sharp edge of the spiral triangular threads 33 will first make a cut into the hard wood and then the bulges 33 will enlarge the cut by force thereby making it easier for the screw to turn into the hard wood.

As shown in FIGS. 4A, 4B and 4C, the pointed tips 321 of the spiral triangular threads 32 may be arranged in alignment as required. As the screw is turned into a piece of wood, the pointed tips 321 of the triangular threads 32 of the screw 2 will cut the wood and the bulge 33 will enlarge the cut to facilitate the turning of the screw into the wood. In addition, the triangular threads 32 may be arranged in different positions as shown in FIG. 5.

Referring to FIGS. 6A and 6B, the present invention is simply made by cutting a cylindrical embryo 4 into a cylindrical shank 3 with triangular spiral threads 32 with pointed tips 321. The manufacturing method is very simple and low in cost.

Figure 7:
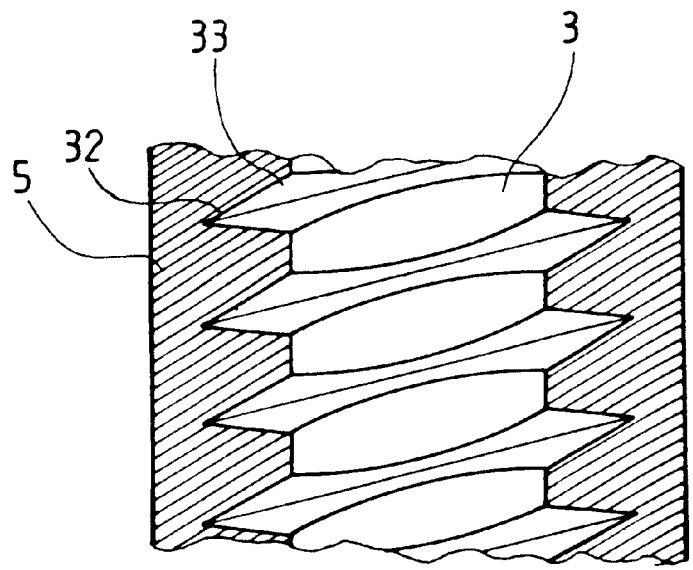
FIGS. 7 and 8 illustrate the working principle of the present invention.
Figure 8:
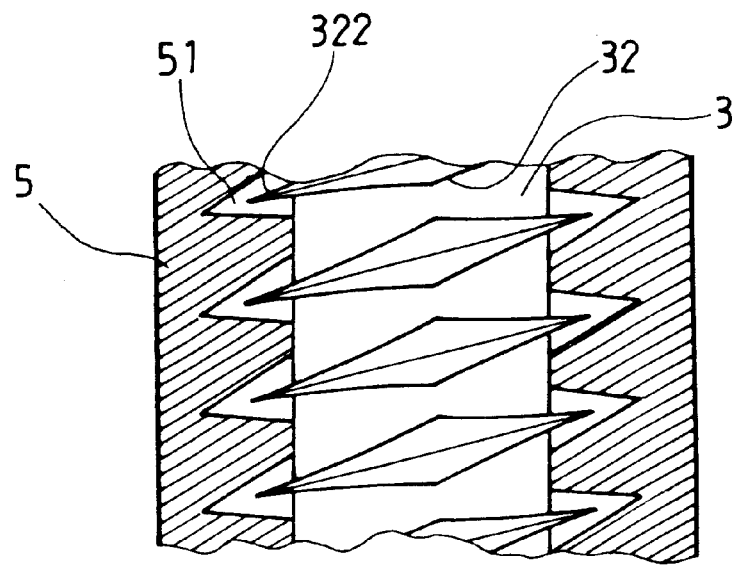

FIGS. 7 and 8 illustrate the working principle of the present invention. As shown, when the screw 3 is turned into a piece of wood 5, the pointed tips 321 of the triangular threads 32 will make a cut in the wood 3 and then the bulge 33 will enlarge the cut by force thereby reducing the friction between the screw 2 and the wood 3. Then, a spiral: passage will be formed as soon as the pointed tips 321 of the triangular threads 32 are turned into the wood 5 so that the circular threads 21 can be easily turned into the wood 5 along the spiral passage.

Figure 9:
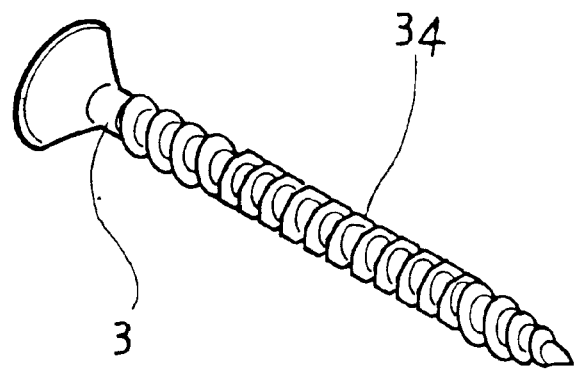
FIGS. 9 and 10 illustrate other preferred embodiments of the present invention.
Figure 10:
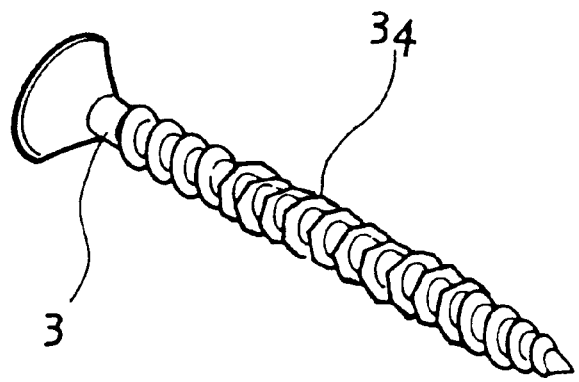

It will be understood that the threads may be of other shapes such as pentagons 34 (see FIG. 9) arranged in alignment or different positions (see FIG. 10), and each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A screw comprising a cylindrical shank having an upper portion formed with spiral circular threads and a lower portion formed with spiral triangular threads, each of said spiral triangular threads having three budges having three sharp edges and three pointed tips, said pointed tips of axially adjacent spriral triangular threads being located at circumferentially different positions, said cylindrical shank having a pointed end at a lower portion thereof.

* * * * *